(12) United States Patent
Yokouchi et al.

(10) Patent No.: US 6,582,130 B2
(45) Date of Patent: Jun. 24, 2003

(54) ROLLING BEARING AND BEARING APPARATUS

(75) Inventors: Atsushi Yokouchi, Kanagawa (JP); Katsuaki Denpo, Kanagawa (JP); Toru Syoda, Kanagawa (JP); Michiharu Naka, Kanagawa (JP); Yasuyuki Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 12 days.

(21) Appl. No.: 09/988,674

(22) Filed: Nov. 20, 2001

(65) Prior Publication Data

US 2002/0097936 A1 Jul. 25, 2002

(30) Foreign Application Priority Data

Nov. 21, 2000 (JP) .......................................... 2000-354570
Apr. 16, 2001 (JP) .......................................... 2001-117225

(51) Int. Cl.[7] .............................................. F16C 19/06
(52) U.S. Cl. ........................................ 384/492; 384/462
(58) Field of Search ................................. 384/492, 462, 384/488, 537, 569

(56) References Cited

U.S. PATENT DOCUMENTS 5,480,231 A * 1/1996 Sasaki et al. ................ 384/206
6,086,261 A * 7/2000 Nakagawa et al. .......... 384/571
2002/0085773 A1 * 7/2002 Shoda et al. .................. 384/47

* cited by examiner

Primary Examiner—Lenard A. Footland
(74) Attorney, Agent, or Firm—Sughrue Mion, PLLC

(57) ABSTRACT

A rolling bearing is described, which comprises an inner ring fitted onto a shaft, an outer ring fitted in the housing, a plurality of rolling elements provided interposed between the inner ring and the outer ring and a lubricant packed thereinside and which is mounted between the shaft and the housing, wherein a rust preventive film comprising an oil-repellent material is formed on at least the outer surface of the outer ring and the inner surface of the inner ring, and a bearing apparatus is also described.

18 Claims, 2 Drawing Sheets

FIG. 1
FIG. 2
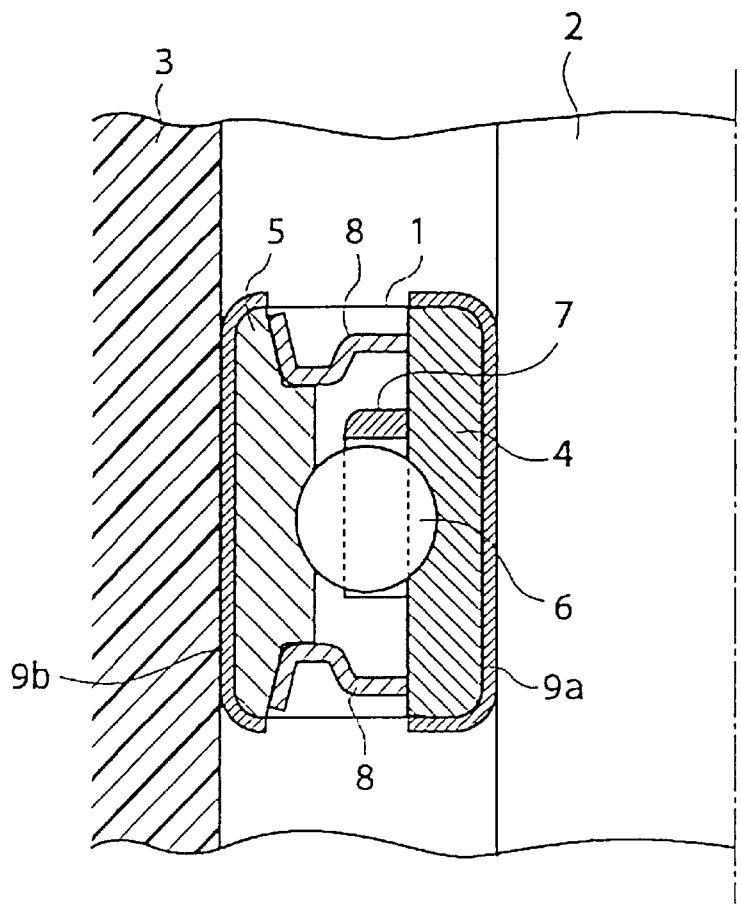
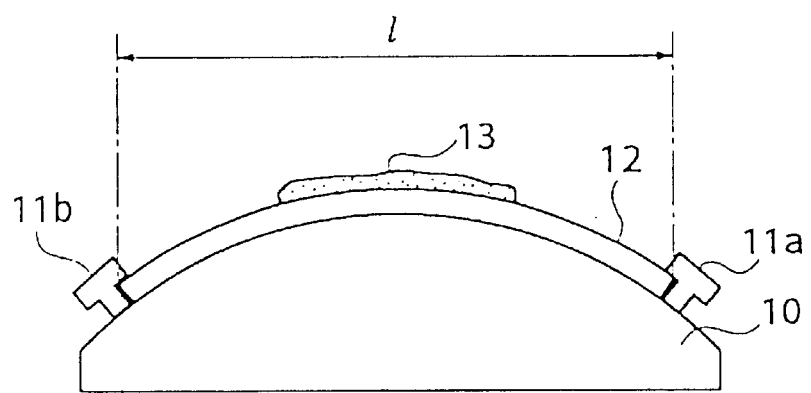

ROLLING BEARING AND BEARING APPARATUS

FIELD OF THE INVENTION

The present invention relates to a rolling bearing and a bearing apparatus. More particularly, the present invention relates to a rolling bearing and a bearing apparatus for use in office appliances such as copying machine and laser beam printer.

BACKGROUND OF THE INVENTION

A rolling bearing for office appliances such as copying machine and laser beam printer is normally mounted in a housing made of resin for use. As the lubricant for such a rolling bearing there is normally used a grease taking into account maintenance and other requirements.

Referring to the type of grease to be used for such a rolling bearing, a grease comprising as a base oil silicone oil or fluorine oil is used for sites to be exposed to extremely high temperature such as fixing roller in copying machine or laser beam printer. For other sites, a grease comprising as a base oil a mineral oil, which is inexpensive and widely used, or synthetic oil except silicone oil and fluorine oil is normally used.

A technique for preventing the grease packed in the interior of the bearing from leaking out of the bearing has been already proposed (JP-A-2-78069 (The term "JP-A" as used herein means an "unexamined published Japanese patent application")). Further, a technique for preventing the grease from leaking out of the bearing as well as improving the lubricating properties of the grease in the interior of the bearing has been already proposed (JP-A-10-326468).

In this kind of rolling bearing, a rust preventive solution is applied to the entire surface of the bearing rings (inner ring and outer ring) to form a rust preventive film on the surface of the bearing. In this arrangement, the rolling bearing is rendered rustproof during the storage in a single form until mounting to the office appliances or in a high temperature and humidity atmosphere during the transportation of the office appliances.

In other words, it has been heretofore practiced to apply a rust preventive solution comprising a rust preventive diluted with a diluent to the entire surface of the rolling bearing so that the rolling bearing is rendered rustproof.

Since the resin material from which the housing is made is subject to load developed by residual stress from molding or external stress, the rise of the ambient temperature during operation causes the rust preventive solution attached to the outer surface of the outer ring and other sites to enter in the resin, possibly causing the deterioration of the strength of the resin. The deterioration of the strength of the resin causes the occurrence of crack or craze (hereinafter referred to as "crack or the like"), resulting in the maloperation of office appliances. Therefore, the selection of the kind of rust preventive has heretofore been made taking into account its effect on the resin material.

As a rust preventive which causes the deterioration of the strength of resin there has heretofore been known a compound having a high polarity such as hydrocarbon compound containing oxygen as a hetero element in a molecular structure such as ester bond and ether bond (e.g., sorbitan fatty acid ester, alkylphosphoric acid and a salt thereof, polyoxyalkylene alkyl ether phosphoric acid and a salt thereof). On the other hand, such a rust preventive is diluted with a diluent comprising an ester-based, ether-based, glycol-based or alcohol-based lubricant or solvent in a concentration of from 0.5% to 10% by weight before use. Therefore, the deterioration of the strength of resin is attributed to the kind of the rust preventive used as well as to the effect of the diluent used.

Therefore, as a rust preventive for this purpose there has heretofore been normally used a metal salt of organic sulfonate free of compound or solvent having a high polarity. The concentration of the rust preventive is adjusted with a mineral oil or synthetic hydrocarbon oil as a diluent.

In recent years, a modified polyphenylene oxide (Noryl (R)) having an excellent heat resistance and dimensional stability which is available at a relatively low price has been used as a resin material from which a housing is made in the art of information electronic apparatus. However, such a modified polyphenylene oxide has a low bending strength and thus is occurred to crack or the like due to strain even if a slight amount of rust preventive is attached thereto. Therefore, in the case where a housing made of modified polyphenylene oxide is used, the bearing is wiped to remove the rust preventive left on the exterior of the bearing before mounted to the office appliances.

The foregoing rust preventive solution containing a metal salt of organic sulfonate has an affinity for general-purpose grease and thus can be easily attached to the entire surface of the bearing. However, this rust preventive solution is disadvantageous in that it can enter in the resin material to deteriorate the strength of the resin and thus leaves something to be desired with respect to such a resin material having a low crystallinity.

In other words, the resin housing in which the rolling bearing is mounted is made of various resin materials depending on the purpose. However, when the housing is formed by a resin material having a low crystallinity, it is disadvantageous in that the rust preventive solution can enter in the resin material to deteriorate the strength of the resin, resulting in the occurrence of crack or the like on the housing.

On the other hand, the above-described JP-A-2-78069 and JP-A-10-326468 disclose a technique for preventing the grease from leaking out of the bearing. However, there are no countermeasures against the entrance of a rust preventive containing a diluent into the resin material.

Further, the foregoing approach involving the use of a modified polyphenylene oxide as a resin material is disadvantageous in that the exterior of the bearing is subject to rusting that causes the deterioration of the bearing life because the rust preventive attached to the exterior of the bearing is removed before the mounting of the rolling bearing in the housing as mentioned above.

SUMMARY OF THE INVENTION

It is therefore an object of the invention to provide a rolling bearing and a bearing apparatus which each can be secured with desired rustproofness without deteriorating the strength of various resin materials.

The foregoing object of the present invention will become apparent from the following detailed description and examples.

As mentioned above, the deterioration of the strength of resin is presumably attributed to the fact that the rust preventive solution prepared by adding a rust preventive to a diluent enters in the resin material.

Under these circumstances, the inventors made extensive studies of rust preventive solution which can hardly enter in the resin material. As a result, a knowledge was obtained that a rust preventive solution containing an oil-repellent rust preventive such as fluorine-based rust preventive has a low affinity for resin materials and thus can hardly enter in resin materials, making it possible to prevent the deterioration of the strength thereof. Another knowledge was obtained that since such an oil-repellent rust preventive has no compatibility with water or a hydrocarbon compound, it cannot deteriorate the strength of resin materials containing a hydrophilic group as well.

The present invention has been worked out on the basis of this knowledge. More specifically, the problems are resolved by the following Embodiments (1) to (18):

(1) A rolling bearing which comprises an inner ring fitted onto a shaft, an outer ring fitted in the housing, a plurality of rolling elements provided interposed between the inner ring and the outer ring and a lubricant packed thereinside and which is mounted between the shaft and the housing, wherein a rust preventive film comprising an oil-repellent material is formed on at least the outer surface of the outer ring and the inner surface of the inner ring.

(2) The rolling bearing as described in (1), wherein at least one of the shaft and the housing is formed by a resin material.

(3) The rolling bearing as described in (1), wherein the rust preventive film is formed by applying a rust preventive solution having from 0.5% to 10% by weight of a fluorine-based rust preventive dissolved in a fluorine-based diluent.

(4) The rolling bearing as described in (3), wherein the fluorine-based rust preventive is a single material comprising a molecular structure comprising a main chain substituted by fluorine which is derived from perfluoroalkyl, perfluoroether or perfluoropolyether and a predetermined functional group containing hetero atoms other than C; H or F by which at least one of the fluorine atom is substituted at one or both ends thereof, or a mixture of a plurality of the different materials.

(5) The rolling bearing as described in (4), wherein the predetermined functional group is selected from the group consisting of a carboxyl group, an isocyanate group, an alcoholic hydroxyl group, and an ester group.

(6) The rolling bearing as described in (5), wherein a fluorine derivative of the rust preventive is represented by the following formula (1):

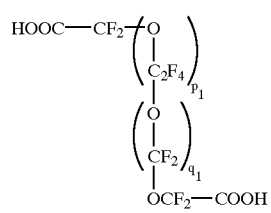

wherein $p_1$ and $q_1$ each represents an integer.

(7) The rolling bearing as described in (5), wherein a fluorine derivative of the rust preventive is represented by the following formula (3):

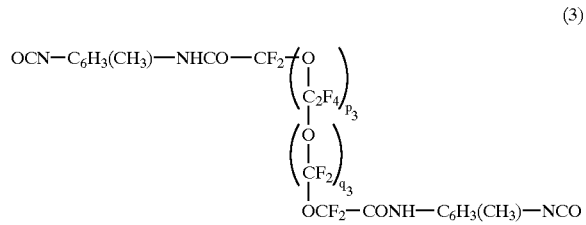

wherein $p_3$ and $q_3$ each represents an integer.

(8) The rolling bearing as described in (3), wherein the fluorine-based diluent comprises a low molecular material in an amount of not greater than a predetermined value.

(9) The rolling bearing as described in (8), wherein the diluent has from 4 to 30 carbon atoms and a molecular weight of not greater than 1,700.

(10) The rolling bearing as described in (8), wherein the diluent is a lubricant, solvent or a hydrochlorofluorocarbon (HCFC) alternative comprising a molecular structure comprising its main chain substituted by fluorine, which is selected from the group consisting of perfluoroalkyl, perfluoroether and perfluoropolyether.

(11) The rolling bearing as described in (8), wherein the diluent is represented by the following formula (2):

wherein $P_2$ and $q_2$ each represents an integer.

(12) The rolling bearing as described in (1), wherein the bearing comprises a seal plate or a shield plate and an amount of the lubricant to be packed is adjusted such that it accounts from 10% to 50% by volume of the space in the bearing.

(13) The rolling bearing as described in (12), wherein after the lubricant has been packed into the interior of the bearing, the rolling bearing is allowed to run in, and an oil-repellent rust preventive diluted with a diluent is applied to the outer surface of the outer ring and the inner surface of the inner ring.

(14) The rolling bearing as described in (13), wherein the conditions for the running-in operation comprises a period of time of from 3 seconds to 5 minutes and the rotational speed of the rolling bearing of from 300 min$^{-1}$ to 10,000 min$^{-1}$.

(15) The rolling bearing as described in (2), wherein the resin material comprises at least a polycarbonate, a polyacetal, an acrylonitrile-butadiene-styrene copolymer, a polystyrene, a polyphenylene oxide, and a modified polyphenylene oxide.

(16) A bearing apparatus which comprises an inner ring fitted onto a shaft, an outer ring fitted in the housing, a plurality of rolling elements provided interposed between the inner ring and the outer ring and a lubricant packed thereinside and which is mounted between the shaft and the housing, wherein a rust preventive film comprising an oil-repellent material is formed on at least the outer surface of the outer ring and the inner surface of the inner ring.

(17) The bearing apparatus as described in (16), wherein at least one of the shaft and housing is formed by a resin material and the resin material comprises at least a polycarbonate, an acrylonitrile-butadiene-styrene copolymer, a polystyrene, a polyphenylene oxide, and a modified polyphenylene oxide.

(18) The bearing apparatus as described in (16), wherein the bearing apparatus is used in office appliances and information apparatus.

The rolling bearing according to the invention comprises an inner ring fitted onto a shaft, an outer ring fitted in the housing, a plurality of rolling elements provided interposed between the inner ring and the outer ring and a lubricant packed thereinside and is mounted between the shaft and the housing, which is characterized in that a rust preventive film comprising an oil-repellent material is formed on at least the outer surface of the outer ring and the inner surface of the inner ring.

In accordance with the foregoing constitution, a rust preventive film made of an oil-repellent material is formed at least on the outer surface of the outer ring and the inner surface of the inner ring, making it possible to secure a desired rustproofness without causing the deterioration of resin strength even if a resin material having a low crystallinity is used to form the housing or the shaft.

A rust preventive is normally used in the form of solution in a diluent. The diluent is preferably compatible with the rust preventive. From this standpoint of view, as both the rust preventive and diluent there are preferably used fluorine-based chemicals. Further, in order to secure both desired rustproofness and mountability, the rust preventive is preferably contained in the diluent in an amount of from 0.5% to 10% by weight.

In some detail, the rolling bearing of the invention is also preferably characterized in that the rust preventive layer is obtained by applying a rust preventive solution having from 0.5% to 10% by weight of a fluorine-based rust preventive dissolved in a fluorine-based diluent.

Moreover, in order to prevent the diluent from remaining on the surface of the bearing to leave stickiness, the diluent preferably is made of a low molecular material (e.g., material having a molecular weight of not greater than 1,700) in an amount of not greater than a predetermined value.

In other words, the present invention is also preferably characterized in that the fluorine-based diluent is made of a low molecular material in an amount of not greater than a predetermined value.

Further, the rust preventive film of the invention has a low affinity for resin materials and shows low compatibility with resin materials containing a hydrophilic group and thus can provide a desired rustproofness while causing no deterioration of strength of resin materials having a good crystallinity such as polycarbonate (hereinafter referred to as "PC") and polyacetal (hereinafter referred to as "POM") as well as resin materials which are considered to have a low crystallinity such as acrylonitrile-butadiene-styrene copolymer (hereinafter referred to as "ABS"), polybutylene terephthalate (hereinafter referred to as "PBT") polystyrene (hereinafter referred to as "PS"), polyphenylene oxide (hereinafter referred to as "PPO") and modified PPO.

In other words, the present invention is also preferably characterized in that the resin material comprises at least one of PC, POM, ABS, PS, PPO, and modified PPO.

BRIEF DESCRIPTION OF THE DRAWINGS

By way of example and to make the description more clear, reference is made to the accompanying drawings in which:

FIG. 1 is a sectional view illustrating an embodiment of the rolling bearing according to the invention;

FIG. 2 is a diagram schematically illustrating an experimental apparatus for use in a test for evaluating resin strength;

DETAILED DESCRIPTION OF THE INVENTION

Figure 3:
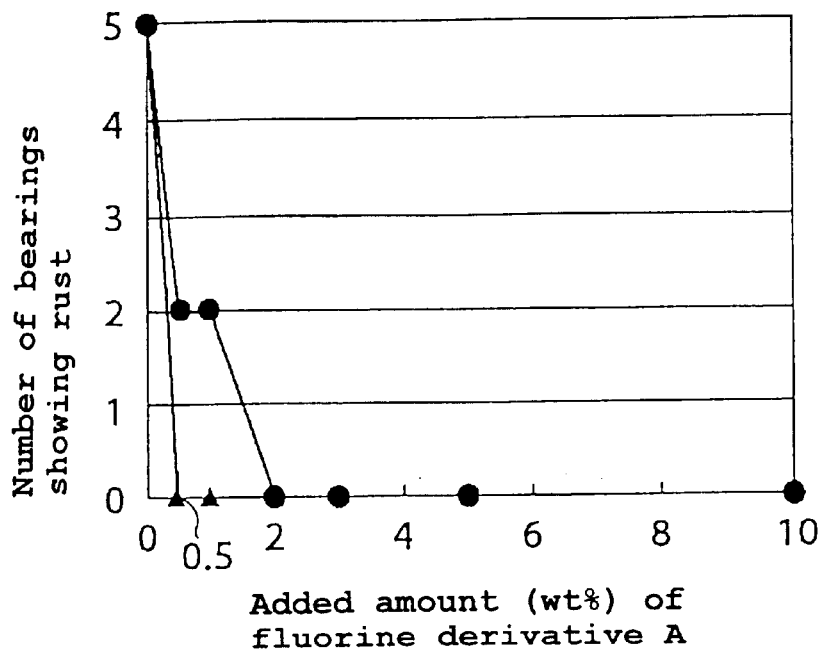
FIG. 3 is a graph illustrating the relationship between the added amount (wt %) of the fluorine derivative A and the number of bearings showing the occurrence of rust.

Embodiments of implication of the present invention will be further described in connection with the attached drawings.

FIG. 1 is a sectional view illustrating an embodiment of the rolling bearing according to the invention. The rolling bearing 1 is mounted between a shaft 2 and a housing 3.

In some detail, the rolling bearing 1 comprises an inner ring 4 fitted onto the shaft 2, an outer ring 5 fitted in the housing 3, a plurality of rolling elements 6 provided interposed between the inner ring 4 and the outer ring 5, a retainer 7 for retaining these rolling elements 6 apart from each other at a predetermined interval, and a seal plate 8 for preventing a grease as a lubricant packed in the bearing from leaking out.

Formed on the outer surface of the outer ring 5 and the inner surface of the inner ring 4 are rust preventive films 9a, 9b made of an oil-repellent material, respectively.

In some detail, as the resin material of the housing 3 there is normally used PC, POM, ABS, PBT, PS, PPO, or the like. Among these resin materials, ABS, PS, PBT, and PPO are resins having a relatively low crystallinity and thus are subject to the effect of rust preventive. Further, since the rust preventive is diluted with a diluent, these resin materials are subject to the effect of the diluent as well. In other words, if the resin material to be used has a low crystallinity and the rust preventive or diluent has an affinity for the resin material, the rust preventive or diluent penetrates into the resin material to deteriorate the strength thereof.

A modified PPO which has been recently used often for this purpose is disadvantageous in that since the rust preventive left on the exterior surface of the bearing has been wiped off before the rolling bearing 1 is mounted in the housing 3, rust can easily occur on the exterior surface of the bearing to deteriorate the life of the bearing as described above.

The results of experiment made by the inventors show that since the rust preventive solution containing an oil-repellent rust preventive such as fluorine-based rust preventive has a low affinity for the resin material and the oil-repellent rust preventive has no compatibility with water or a hydrocarbon compound, the deterioration of the strength of a resin material having a hydrophilic group can be avoided.

Therefore, in the present embodiment, a rust preventive solution containing an oil-repellent rust preventive is applied to the outer surface of the outer ring and the inner surface of the inner ring to form oil-repellent rust preventive films 9a, 9b, respectively, thereon, making it possible to exert a desired effect of preventing rust while avoiding the deterioration of the strength of the resin material.

As the oil-repellent rust preventive material there may be used a material comprising a molecular structure comprising a main chain substituted by fluorine which is derived from perfluoroalkyl, perfluoroether or perfluoropolyether and a predetermined functional group containing hetero atoms other than C, H or F by which at least one of the fluorine atom is substituted at one or both ends thereof. Examples of the predetermined functional group include carboxyl group (—COOH), isocyanate group (—NCO), alcoholic hydroxyl group (—OH), and ester group (—COOR, wherein R represents a hydrocarbon such as an alkyl group). In order to exert the rust preventing effect more effectively, carboxyl group (—COOH) and isocyanate group (—NCO) are preferred. These rust preventive materials may be used singly. Alternatively, a plurality of different rust preventive materials may be used in proper combination. As such a rust preventive material there may be used FOMBLIN DA Series SV90AR (produced by AUSIMONT K.K.).

As the diluent material for diluting the rust preventive there is preferably used one having a good compatibility with the rust preventive material. For example, a lubricant, solvent or a hydrochlorofluorocarbon (HCFC) alternative comprising a molecular structure comprising its main chain substituted by fluorine such as perfluoroalkyl, perfluoroether and perfluoropolyether may be used. Further, as the molecular weight of the diluent material increases, it is more likely that the diluent can remain on the surface of the bearing to leave so-called "stickiness". Therefore, it is preferred to use a low molecular material having from 3 to 30 carbon atoms and a molecular weight of from about 1,600 to 1,700 at maximum, preferably not greater than 1,000.

The concentration of the rust preventive in the diluent is preferably from 0.5% to 10% by weight, more preferably from 2% to 10% by weight.

In some detail, when the concentration of the rust preventive in the diluent falls below 0.5% by weight, the content of the rust preventive is too small to exert a desired rust preventing effect. On the contrary, when the concentration of the rust preventive in the diluent exceeds 10% by weight, the content of the rust preventive component in the rust preventive films 9a, 9b is excessive. When the excessive rust preventive component is attached to the contact portion on the raceway in the bearing in a large amount, the supply of the grease into the contact portion on the raceway is inhibited, causing the deterioration of the lubricating properties of the grease and making it impossible to mount the rolling bearing 1 in the housing 3.

Therefore, in the present embodiment, the concentration of the rust preventive in the diluent is determined to be from 0.5% to 10% by weight, preferably from 2% to 10% by weight.

In the present embodiment, the rust preventive solution is not applied to the inner raceway surface of the outer ring 5 and the outer raceway surface of the inner ring 4 but is applied only to the outer surface of the outer ring 5 and the inner surface of the inner ring 4. Accordingly, the oil-repellent rust preventive films 9a, 9b are formed on the outer surface of the outer ring 5 and the inner surface of the inner ring 4, respectively.

In some detail, as mentioned above, the rust preventive is diluted with a diluent before use. However, when the oil-repellent rust preventive is attached even to the interior of the bearing in a large amount, the adhesion of the lubricant packed in the bearing to the surface of the bearing is deteriorated, causing the lubricant to leak out of the bearing and possibly causing the deterioration of the strength of the resin depending on the formulation of the lubricant used. Accordingly, the attachment of the oil-repellent rust preventive to the interior of the bearing within which the lubricant is packed is preferably inhibited as much as possible. From this standpoint of view, the rust preventive solution containing an oil-repellent rust preventive is applied only to the outer surface of the outer ring 5 and the inner surface of the inner ring 4 in the present embodiment.

Since the rust preventive is not applied to the interior of the bearing, it can be thought that when the grease is not uniformly spread over the inner surface of the bearing, rust can occur on the area where the grease has not been spread. However, as mentioned later, by allowing the rolling bearing 1 within which a predetermined amount of the grease has been packed to run in, the grease can be easily spread all over the inner surface of the bearing.

The process for the preparation of the rolling bearing 1 will be described hereinafter.

The rolling elements 6 are provided interposed between the inner ring 4 and the outer ring 5 apart from each other at a predetermined interval through a retainer 7. Subsequently, a predetermined amount of the grease is uniformly packed into the interior of the bearing, i.e., space between the rolling elements 6. The amount of the grease to be packed is adjusted such that it accounts from 10% to 50% by volume of the space in the bearing.

In other words, by uniformly attaching the grease to the interior of the bearing, the effect of preventing rust in the interior of the bearing can be exerted. However, when the amount of the grease to be packed falls below 10% by volume of the space in the bearing, the grease cannot be attached to all areas in the interior of the bearing even if the bearing is allowed to run in, making it impossible to exert the desired effect of preventing rust. On the contrary, when the amount of the grease to be packed exceeds 50% by volume of the space in the bearing, it is likely that the grease can leak out of the bearing.

Therefore, in the present embodiment, the amount of the grease to be packed is predetermined to be from 10% to 50% by volume of the space in the bearing.

After a predetermined amount of the grease has thus been packed into the interior of the bearing, the seal plate 8 is then mounted to the bearing. Thereafter, the rolling bearing 1 is allowed to run in for a period of time predetermined to be from 3 seconds to 5 minutes.

In other words, when the operating time falls below 3 seconds, the grease cannot be attached to all areas in the interior of the bearing, making it impossible to exert the desired effect of preventing rust. On the contrary, it is undesirable from the standpoint of production efficiency that the bearing is allowed to run in for a period of time as long as greater than 5 minutes. Therefore, the running-in time is predetermined to be from 3 seconds to 5 minutes in the present embodiment.

The rotational speed of the rolling bearing 1 during running-in operation is predetermined to be from 300 min$^{-1}$ to 10,000 min$^{-1}$. In other words, when the rotational speed of the rolling bearing 1 falls below 300 min$^{-1}$, it takes much time for the grease to be attached to all areas in the interior of the bearing. On the contrary, when the rotational speed of the rolling bearing 1 exceeds 10,000 min$^{-1}$, the resulting centrifugal force can cause the grease to leak out of the bearing. Therefore, the rotational speed during running-in operation is predetermined to be from 300 min$^{-1}$ to 10,000 min$^{-1}$ in the present embodiment.

Whether or not the grease is attached to all areas in the interior of the bearing can be visually recognized by observing how the grease is attached to the inner surface of the seal plate 8 removed from the bearing which has been thus allowed to run in.

After the bearing has been thus allowed to run in, the oil-repellent rust preventive diluted with a diluent, i.e., oil-repellent rust preventive solution is applied to the outer surface of the outer ring 5 and the inner surface of the inner ring 4 to form rust preventive films 9a, 9b, respectively, thereon.

In some detail, the rolling bearing 1 is showered with the rust preventive solution. The rolling bearing 1 is then rotated so that the resulting centrifugal force causes extra rust preventive solution to be removed. Alternatively, the rust preventive solution is sprayed onto the rolling bearing 1 so that it is applied to the outer surface of the outer ring 5 and the inner surface of the inner ring 4. In this manner, the rust preventive films 9a, 9b are formed.

Thus, in accordance with the present embodiment, the oil-repellent rust preventive diluted with a diluent is applied to the outer surface of the outer ring 5 and the inner surface of the inner ring 4 to form the oil-repellent rust preventive films 9a, 9b, respectively, thereon. In this manner, the rust preventive film 9b on the outer surface of the outer ring cannot enter into the interior of the housing 3 of resin, making it possible to avoid the occurrence of crack in the housing. Further, by allowing the bearing within which the grease has been packed to run in in a predetermined manner so that the grease is applied to all areas in the interior of the bearing, the occurrence of rust in the interior of the bearing can be prevented as well.

The running-in operation can be omitted in an atmosphere where the occurrence of rust in the rolling bearing within which the grease has been packed can be prevented until the rolling bearing is mounted in office appliances such as copying machine and laser beam printer for use.

While the present embodiment has been described with reference to the case where the housing 3 is formed by a resin material, the present invention can be applied also to the case where the shaft 1 is formed by a resin material.

The present invention will be further described in the following examples, but the present invention should not be construed as being limited thereto.

1ST EXAMPLE

The inventors added a fluorine derivative represented by the following formula (1) having one of terminal fluorine atoms in perfluoropolyether substituted by a carboxyl group (hereinafter referred to as "fluorine derivative A") as a rust preventive material to a low molecular perfluoropolyether (molecular weight: 400) represented by the following formula (2) as a diluent in an amount of 3% by weight to prepare a rust preventive solution of Example 1.

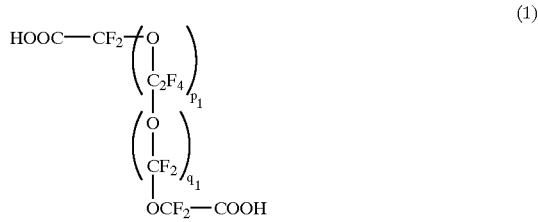

In the formula (1), $p_1$ and $q_1$ each represents an integer.

In the formula (2), $p_2$ and $q_2$ each represents an integer.

The inventors added a fluorine derivative represented by the formula (3) having one of terminal fluorine atoms in perfluoropolyether substituted by an isocyanate group (hereinafter referred to as "fluorine derivative B") as a rust preventive material to a diluent made of the same low molecular perfluoropolyether as used in Example 1 in an amount of 3% by weight to prepare a rust preventive solution of Example 2.

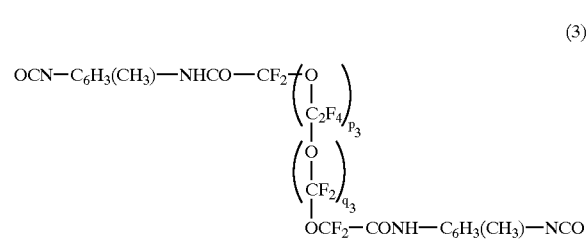

In the formula (3), $p_3$ and $q_3$ each represents an integer.

Further, the inventors prepared as comparative rust preventive solutions the foregoing low molecular perfluoropolyether (Comparative Example 1), a fluoropolyether oil which is a fluorine-based oil (Comparative Example 2), a poly-α-olefin oil which is a synthetic oil (Comparative Example 3), an additive-free turbine oil which is a mineral oil (Comparative Example 4) and an aromatic ester oil which is an ester-based oil (Comparative Example 5).

Table 1 shows the formulation of the rust preventive solutions of these examples and comparative examples.

TABLE 1

| Example Nos. | Formulation | |
|---|---|---|
| 1 | Low molecular + perfluoropolyether | Fluorine derivative A (3 wt %) |
| 2 | Low molecular + perfluoropolyether | Fluorine derivative B (3 wt %) |
| Comparative | | |

TABLE 1-continued

Formulation

| Example Nos. | |
|---|---|
| 1 | Low molecular perfluoropolyether |
| 2 | Fluoropolyether oil |
| 3 | Poly-α-olefin oil |
| 4 | Turbine oil (additive-free) |
| 5 | Aromatic ester oil |

Subsequently, a deforming fixture 10 as shown in FIG. 2 was used, a test specimen 12 made of a predetermined resin material was engaged with a pair of test specimen fixing members 11a, 11b having a T-shaped section provided on the deforming fixture 10 and fixed on the deforming fixture 10 while being deformed. Subsequently, the foregoing oil-repellent rust preventive was applied to the test specimen 12 at a predetermined area in the vicinity of the top thereof to form a coat film (rust preventive film) 13 thereon, and then allowed to stand at a temperature of 23° C. and a relative humidity of from 50% to 60% for 48 hours. The surface of the test specimen 12 was then observed to evaluate the strength of the resin.

In some detail, the rust preventive solutions of Examples 1 and Comparative Examples 1 to 5 were tested on test specimens 12 made of various resin materials, i.e., POM, PC, ABS, PBT, PS and modified PPO with the percent deformation η being varied by moving the test specimen fixing members 11a, 11b. These test specimens 12 were then visually observed to see if craze or crack occurred. Thus, the strength of resin was evaluated.

Table 2 shows the results of evaluation of resin strength.

TABLE 2

| | | POM | PC | ABS | PBT | PS | Modified PPO |
|---|---|---|---|---|---|---|---|
| Example Nos. | 1 | E | E | E | E | E | E |
| | 2 | E | E | E | E | E | G |
| Comparative Example Nos. | 1 | E | E | E | E | E | E |
| | 2 | E | E | E | E | E | E |
| | 3 | E | E | F | G | F | P |
| | 4 | E | E | P | P | P | P |
| | 5 | E | P | P | F | P | P |

In Table 2, E (excellent) indicates that the crack can not be observed when the percent deformation η is not smaller than 1.6%, G (good) indicates that the crack can be observed when the percent deformation η is from not smaller than 1.2% to smaller than 1.6%, F (fair) indicates that the crack can be observed when the percent deformation η is from not smaller than 0.4% to smaller than 1.2%, and P (poor) indicates that the crack can be observed when the percent deformation η is smaller than 0.4%.

The percent deformation η is defined by the following equation (4):

$$\eta = \{(l_0 - l)/l\} \times 100 \quad (4)$$

wherein $l^0$ indicates the total horizontal length of the undeformed test specimen, and l indicates the total horizontal length of the deformed test specimen.

In Example 1 and Comparative Examples 1 and 2, even when the percent deformation η was greater than 1.6%, none of the test specimens underwent crack or the like. In Example 2, no crack or other defectives occurred when the percent deformation was not smaller than 1.2%. This demonstrates that the application of the rust preventive solutions of Examples 1 and 2 and Comparative Examples 1 and 2 to the resin material makes it possible to prevent the deterioration of the strength of the resin. This is presumably attributed to the fact that the fluorine-based rust preventive solutions used in Examples 1 and 2 and Comparative Examples 1 and 2 have a low affinity for resin materials and thus can hardly penetrate into the resin materials.

In Comparative Example 3, on the other hand, no crack or other defects occurred on POM and PC even when the percent deformation η was greater than 1.6%. No crack or other defects occurred on PBT when the percent deformation η was not smaller than 1.2%. Accordingly, in Comparative Example 3, the deterioration of the strength of resin materials having a relatively high crystallinity such as POM, PC and PBT can be avoided. However, crack or other defects occurred on ABS and PS, which have a low crystallinity, when the percent deformation η was not greater than 1.0%. Further, crack or other defects occurred on modified PPO when the percent deformation η was smaller than 0.4%.

In Comparative Example 4, no crack or other defects occurred on POM and PV even when the percent deformation η was greater than 1.6%. For the same reason as in Comparative Example 3, however, the occurrence of crack or other defects was observed on ABS, PBT and PS when the percent deformation η was smaller than 0.4%.

In Comparative Example 5, no crack or other defects occurred on only POM even when the percent deformation η was greater than 1.6%. However, the deterioration of the strength of resin was remarkable on resin materials other than POM.

This is presumably attributed to the fact that while POM and PC have a relatively good crystallinity and thus can hardly undergo crack or other defects due to the deformation, ABS, PBT, PS and modified PPO have a low crystallinity and a poor bending strength and thus are subject to the occurrence of crack or other defects.

The inventors subjected the rust preventive solutions of Examples 1 and 2 and Comparative Examples 1 and 2, which exhibited good properties with respect to the various resin materials, and the rust preventive solution of Comparative Example 3, which comprised a synthetic oil, to evaluation of rustproofness using a rolling bearing having a size of φ19×φ8×6 with a non-contact type seal made of steel plate, and with a retainer obtained by pressing a corrugated steel plate.

In some detail, the foregoing rolling bearing was thoroughly degreased with a petroleum benzidine, and then dried. A commercially available grease of mineral oil type containing a lithium soap as a thickening agent was uniformly packed into the gap between the rolling elements such that it accounted for 25% by volume of the space volume of the interior of the bearing. Subsequently, the rust preventive solutions of Examples 1 and 2 and Comparative Examples 1 to 3 were each sprayed uniformly onto the outer surface of the outer ring and the inner surface of the inner ring to prepare test specimens which were then allowed to stand at a temperature of 30° C. and a relative humidity of 95% for 50 hours, 100 hours and 150 hours. The occurrence of rust was then observed.

Five test specimens were prepared in total for each of Examples 1 and 2, and Comparative Examples 1 to 3. The occurrence of so-called small rust and heavier rust was observed. The number of bearings showing rust was determined to evaluate rustproofness.

Table 3 shows the results of evaluation of rustproofness.

TABLE 3

|  | 50 hours | 100 hours | 150 hours |
|---|---|---|---|
| Example Nos. | | | |
| 1 | 0 | 0 | 0 |
| 2 | 0 | 0 | 0 |
| Comparative Example Nos. | | | |
| 1 | 3 | 5 | 5 |
| 2 | 1 | 2 | 4 |
| 3 | 2 | 5 | 5 |

As can be seen in Table 3, some of the test specimens of Comparative Examples 1 to 3 were observed to have already shown the occurrence of rust after the elapse of 50 hours because these test specimens were coated with a volatile fluorine-based oil or synthetic oil and thus had no oil-repellent rust preventive films formed thereon. Further, after the elapse of 150 hours, these test specimens were observed to show the occurrence of rust at a provability as high as not smaller than 80%. On the contrary, none of the test specimens of Examples 1 and 2 were observed to show the occurrence of rust even after the elapse of 150 hours because they had a rust preventive film made of an oil-repellent material, demonstrating that the rust preventive solutions of Examples 1 and 2 are excellent in rustproofness.

2ND EXAMPLE

The inventors measured the relationship between the amount of the fluorine derivative A or fluorine derivative B as an oil-repellent rust preventive to be added to a low molecular perfluoropolyether as a diluent and the occurrence of rust.

In some detail, six fluorine derivative A-containing rust preventive solutions having the fluorine derivative A added to the low molecular perfluoropolyether in an amount of 0.5%, 1%, 2%, 3%, 5% and 10% by weight, respectively, were prepared. Similarly, six fluorine derivative B-containing rust preventive solutions having the fluorine derivative B added to the low molecular perfluoropolyether in an amount of 0.5%, 1%, 2%, 3%, 5% and 10% by weight, respectively, were prepared.

Subsequently, in the same manner as in the 1st example, the foregoing rolling bearing was thoroughly degreased with a petroleum benzidine, and then dried. A commercially available grease of mineral oil type containing a lithium soap as a thickening agent was then uniformly packed into the gap between the rolling elements such that it accounted for 25% by volume of the space volume of the interior of the bearing.

Subsequently, the foregoing various rust preventive solutions and low molecular perfluoropolyethers free of fluorine derivatives A and B were each sprayed uniformly onto the outer surface of the outer ring and the inner surface of the inner ring to prepare test specimens which were then allowed to stand at a temperature of 30° C. and a relative humidity of 95% for 100 hours and 200 hours. The occurrence of rust was then observed. Five test specimens were prepared for each of the various rust preventive solutions. The occurrence of so-called small rust and heavier rust was observed. The number of bearings showing rust was determined to evaluate rustproofness.

Figure 4:
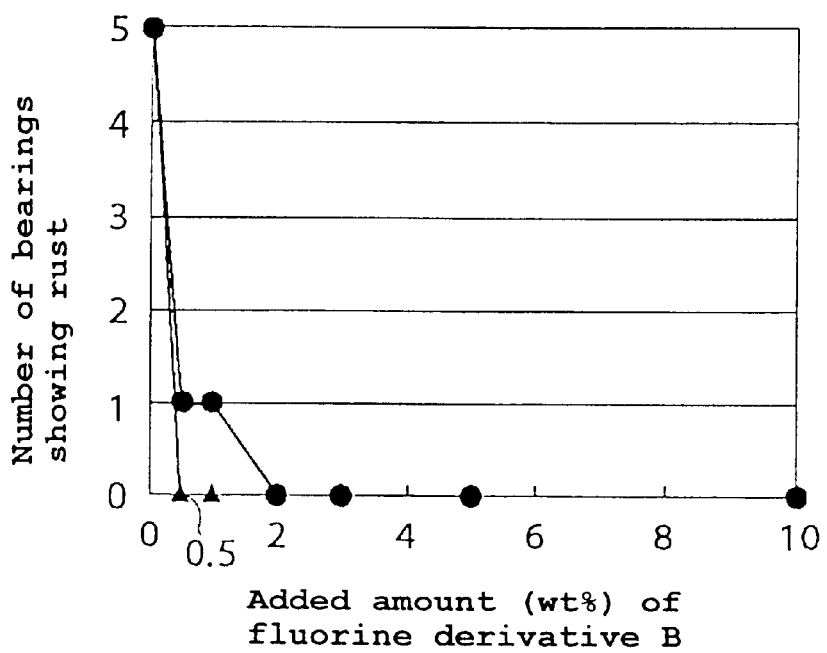
FIG. 4 is a graph illustrating the relationship between the added amount (wt %) of the fluorine derivative B and the number of bearings showing the occurrence of rust, wherein the reference numeral 4 indicates an inner ring, the reference numeral 5 indicates an outer ring, and the reference numerals 9a, 9b each indicates a rust preventive film.

FIG. 3 illustrates the relationship between the added amount (wt %) of the fluorine derivative A and the number of bearings showing the occurrence of rust. FIG. 4 illustrates the relationship between the added amount (wt %) of the fluorine derivative B and the number of bearings showing the occurrence of rust. In these graphs, the abscissa indicates the added amount of the fluorine derivative A or B and the ordinate indicates the number of bearings showing the occurrence of rust. The symbols ▲ and ● indicate the number of bearings showing the occurrence of rust after 100 hours and 200 hours, respectively.

As can be seen in FIGS. 3 and 4, when the rust preventive solutions were free of fluorine derivative A or B, all the five test specimens showed the occurrence of rust after the elapse of 200 hours. On the contrary, the rust preventive solutions comprising the fluorine derivative A or B incorporated therein in an amount of 0.5% or 1.0% by weight caused no occurrence of rust on these test specimens after the elapse of 100 hours. Even after the elapse of 200 hours, the number of test specimens showing the occurrence of rust was as small as 2. It was further made obvious that the rust preventive solutions comprising the fluorine derivative A or B incorporated therein in an amount of not smaller than 2% by weight caused no occurrence of rust even after the elapse of 200 hours.

On the other hand, when the content of the fluorine derivative A or B was larger than 10% by weight, the resulting rust preventive film was too thick to allow the bearing to be smoothly mounted on the housing. Therefore, it was confirmed that the content of the fluorine derivative A or B is preferably predetermined to be from 0.5% to 10% by weight, preferably from 2% to 10% by weight.

3RD EXAMPLE

The inventors evaluated the effect of the presence of running-in operation on rustproofness using a rolling bearing having a size of $\phi 19 \times \phi \times \phi 8 \times 6$ with a non-contact type seal made of steel plate provided with a retainer obtained by pressing a corrugated steel plate.

In some detail, in the same manner as in the 1st and 2nd examples, the foregoing rolling bearing was thoroughly degreased with a petroleum benzidine, and then dried. A commercially available grease of mineral oil type containing a lithium soap as a thickening agent was uniformly packed into the gap between the rolling elements such that it accounted for 25% by volume of the space volume of the interior of the bearing.

Thereafter, a non-contact seal made of steel plate was mounted in a predetermined position. The inner ring of the bearing was then rotated at a rotational speed of 300 min$^{-1}$ for 3 seconds so that it was allowed to run in.

Subsequently, the rust preventive solution of Example 1 was sprayed uniformly onto the outer surface of the outer ring and the inner surface of the inner ring to prepare a test specimen having an oil-repellent rust preventive film formed thereon. The test specimen thus obtained was then allowed to stand for 1 week in an atmosphere where the temperature was varied from 5° C. to 60° C. in a predetermined cycle with the relative humidity of 80% at temperature of 30° C. as standard. The test specimen was then observed for the occurrence of rust on the inner and outer surfaces of the outer ring and the inner and outer surfaces of the inner ring (Example 11).

The inventors packed the same grease as used in Example 11 in the interior of the same rolling bearing as used in Example 11 in the same manner as mentioned above. A non-contact seal made of steel plate was then mounted in a predetermined position. The rust preventive solution of Example 1 was immediately sprayed uniformly onto the outer surface of the outer ring and the inner surface of the inner ring while the rolling bearing was being prevented from rotating. Thus, a test specimen having an oil-repellent rust preventive film formed thereon was prepared. The test specimen thus obtained was then allowed to stand for 1 week in an atmosphere where the temperature was varied from 5° C. to 60° C. in a predetermined cycle with the relative humidity of 80% at temperature of 30° C. as standard. The test specimen was then observed for the occurrence of rust on the inner and outer surfaces of the outer ring and the inner and outer surfaces of the inner ring (Comparative Example 11).

Five specimens were prepared in total for each of Example 11 and Comparative Example 11. The occurrence of so-called small rust and heavier rust was observed. The number of bearings showing rust was determined to evaluate rustproofness.

Table 4 shows the results of evaluation of rustproofness.

TABLE 4

| Example No. | Inner surface of inner ring | Outer surface of outer ring | Outer surface of inner ring | Inner surface of outer ring | Judgment |
| --- | --- | --- | --- | --- | --- |
| Example 11 | 0 | 0 | 0 | 0 | Good |
| Comparative Example 11 | 0 | 0 | 4 | 5 | Poor |

As can be seen in Table 4, Comparative Example 11 showed no occurrence of rust on the inner surface of the inner ring and the outer surface of the outer ring, on which the rust preventive had been applied but showed the occurrence of rust on the outer surface of the inner ring and the inner surface of the outer ring on 4 or 5 out of the five test specimens. This is presumably attributed to the fact that since the rolling bearing of Comparative Example 11 was not allowed to run in after packing the grease, even when the grease was packed, there occurred an unevenness in the effect of preventing rust on the outer surface of the inner ring and the inner ring of the outer ring, causing partial occurrence of rust when the temperature change was severe.

In Example 11, on the contrary, the rolling bearing was allowed to run in after packing the grease. In this manner, the grease was more uniformly spread all over the area on the outer surface of the inner ring and the inner surface of the outer ring. Accordingly, no rusting was observed not only on the inner surface of the inner ring and the outer surface of the outer ring but also on the outer surface of the inner ring and the inner surface of the outer ring, demonstrating that a better effect of preventing rust can be exerted.

As mentioned in detail above, the rolling bearing according to the invention comprises an inner ring fitted onto a shaft, an outer ring fitted in the housing, a plurality of rolling elements provided interposed between the inner ring and the outer ring and a lubricant packed thereinside and is mounted between a shaft and a housing, which is characterized in that a rust preventive film comprising an oil-repellent material is formed on at least the outer surface of the outer ring and the inner surface of the inner ring. In this arrangement, the rust preventive film cannot enter into the resin material. Accordingly, even when the housing or shaft is formed by a resin material having a low crystallinity, the desired rustproofness can be secured without causing the deterioration of the strength of resin.

Further, since the foregoing rust preventive film is obtained by applying a rust preventive solution having from 0.5% to 10% by weight of a fluorine-based rust preventive dissolved in a fluorine-based diluent, the compatibility between the rust preventive and the diluent is excellent, making it possible to prevent the occurrence of rust effectively.

By using as the fluorine-based diluent a low molecular material in an amount of not greater than a predetermined value, the diluent can be prevented from remaining on the surface of the bearing, leaving so-called stickiness.

As mentioned above, in accordance with the present invention, even if the housing or shaft on which the rolling bearing is mounted is properly formed by a resin material such as PC, POM, ABS, PS, PPO and modified PPO according to the purpose, the occurrence of rust on the rolling bearing can be effectively inhibited without causing the deterioration of the strength of resin.

While the invention has been described in detail and with reference to specific embodiments thereof, it will be apparent to one skilled in the art that various changes and modifications can be made therein without departing from the spirit and scope thereof.

What is claimed is:

1. A rolling bearing which comprises an inner ring fitted onto a shaft, an outer ring fitted in a housing, a plurality of rolling elements provided interposed between the inner ring and the outer ring and a lubricant packed thereinside and which is mounted between the shaft and the housing, wherein a rust preventive film comprising an oil-repellent material is formed on at least the outer surface of the outer ring and the inner surface of the inner ring.

2. The rolling bearing according to claim 1, wherein at least one of the shaft and the housing is formed by a resin material.

3. The rolling bearing according to claim 2, wherein said resin material comprises at least a polycarbonate, a polyacetal, an acrylonitrile-butadiene-styrene copolymer, a polystyrene, a polyphenylene oxide, and a modified polyphenylene oxide.

4. The rolling bearing according to claim 1, wherein said rust preventive film is formed by applying a rust preventive solution having from 0.5% to 10% by weight of a fluorine-based rust preventive dissolved in a fluorine-based diluent.

5. The rolling bearing according to claim 4, wherein said fluorine-based rust preventive is a single material comprising a molecular structure comprising a main chain substituted by fluorine which is derived from perfluoroalkyl, perfluoroether or perfluoropolyether and a predetermined functional group containing hetero atoms other than C, H or F by which at least one of the fluorine atom is substituted at one or both ends thereof, or a mixture of a plurality of the different materials.

6. The rolling bearing according to claim 5, wherein said predetermined functional group is selected from the group consisting of a carboxyl group, an isocyanate group, an alcoholic hydroxyl group, and an ester group.

7. The rolling bearing according to claim 6, wherein a fluorine derivative of said rust preventive is represented by the following formula (1):

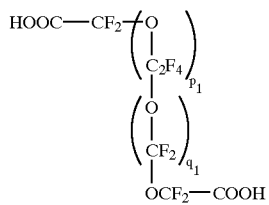
(1)

wherein $p_1$ and $q_1$ each represents an integer.

8. The rolling bearing according to claim 6, wherein a fluorine derivative of said rust preventive is represented by the following formula (3):

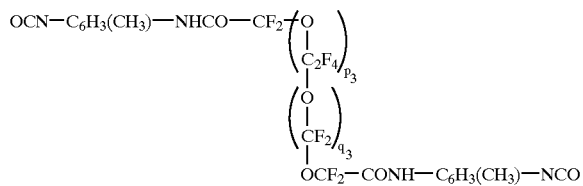
(3)

wherein $p_3$ and $q_3$ each represents an integer.

9. The rolling bearing according to claim 4, wherein said fluorine-based diluent comprises a low molecular material in an amount of not greater than a predetermined value.

10. The rolling bearing according to claim 9, wherein said diluent is a lubricant, solvent or a hydrochlorofluorocarbon alternative comprising a molecular structure comprising its main chain substituted by fluorine, which is selected from the group consisting of perfluoroalkyl, perfluoroether and perfluoropolyether.

11. The rolling bearing according to claim 9, wherein said diluent is represented by the following formula (2):

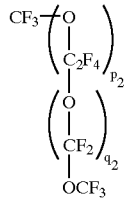
(2)

wherein $P_2$ and $q_2$ each represents an integer.

12. The rolling bearing according to claim 9, wherein said diluent has from 4 to 30 carbon atoms and a molecular weight of not greater than 1,700.

13. The rolling bearing according to claim 1, wherein said bearing comprises a seal plate or a shield plate and an amount of the lubricant to be packed is adjusted such that it accounts from 10% to 50% by volume of the space in the bearing.

14. The rolling bearing according to claim 13, wherein after the lubricant has been packed into the interior of the bearing, the rolling bearing is allowed to run in, and an oil-repellent rust preventive diluted with a diluent is applied to the outer surface of the outer ring and the inner surface of the inner ring.

15. The rolling bearing according to claim 14, wherein the conditions for the running-in operation comprises a period of time of from 3 seconds to 5 minutes and the rotational speed of the rolling bearing of from 300 $min^{-1}$ to 10,000 $min^{-1}$.

16. A bearing apparatus which comprises an inner ring fitted onto a shaft, an outer ring fitted in the housing, a plurality of rolling elements provided interposed between the inner ring and the outer ring and a lubricant packed thereinside and which is mounted between the shaft and the housing, wherein a rust preventive film comprising an oil-repellent material is formed on at least the outer surface of the outer ring and the inner surface of the inner ring.

17. The bearing apparatus according to claim 16, wherein at least one of the shaft and housing is formed by a resin material and the resin material comprises at least a polycarbonate, a polyacetal, an acrylonitrile-butadiene-styrene copolymer, a polystyrene, a polyphenylene oxide, and a modified polyphenylene oxide.

18. The bearing apparatus according to claim 16, wherein said bearing apparatus is used in office appliances and information apparatus.

* * * * *